United States Patent
Rose (10) Patent No.: US 8,944,355 B2
(45) Date of Patent: Feb. 3, 2015

(54) STIRRING AND CHOPPING DEVICE

(71) Applicant: Eric Paul Rose, Tarzana, CA (US)

(72) Inventor: Eric Paul Rose, Tarzana, CA (US)

(*) Notice: Subject to any disclaimer, the term of this patent is extended or adjusted under 35 U.S.C. 154(b) by 0 days.

(21) Appl. No.: 13/952,986

(22) Filed: Jul. 29, 2013

(65) Prior Publication Data

US 2014/0061346 A1 Mar. 6, 2014

Related U.S. Application Data

(60) Provisional application No. 61/696,288, filed on Sep. 3, 2012.

(51) Int. Cl.
*A47J 17/00* (2006.01)
*A47J 43/00* (2006.01)
*A47J 43/28* (2006.01)

(52) U.S. Cl.
CPC .................................. *A47J 43/288* (2013.01)
USPC ........................................ 241/168; 241/169.2

(58) Field of Classification Search
USPC ................. 241/168, 169.2, DIG. 27; D7/372, D7/374–376; 366/129; 30/303
See application file for complete search history.

(56) References Cited

U.S. PATENT DOCUMENTS

| | | | | |
|---|---|---|---|---|
| 54,987 A | * | 5/1866 | Whitney | 241/169.2 |
| 343,754 A | * | 6/1886 | Bradly | 241/169.2 |
| 1,095,092 A | * | 4/1914 | Drake | 30/303 |
| 2,484,391 A | * | 10/1949 | Treiss, Jr. | 241/101.3 |
| 2,628,647 A | * | 2/1953 | Rohmer | 241/169.2 |
| 2,928,483 A | * | 3/1960 | Trost | 172/378 |
| 5,014,921 A | * | 5/1991 | Skerker et al. | 241/169.2 |
| 5,732,616 A | | 3/1998 | Bryan | |
| 7,159,810 B1 | * | 1/2007 | Miller | 241/168 |
| D649,389 S | * | 11/2011 | Bickert et al. | D7/300.2 |
| 2011/0174908 A1 | | 7/2011 | Curtin | |

* cited by examiner

*Primary Examiner* — Faye Francis
(74) *Attorney, Agent, or Firm* — Marc E. Hankin; Hankin Patent Law, APC; Kevin E. Schraven (57) ABSTRACT

A kitchen utensil device comprising of an elongated handle and tapered silicone fins. The kitchen utensil device is useful for effectively stirring foods and liquids and also has a sharp cutting edge on the bottom. This makes the kitchen utensil device useful for both stirring and chopping, potentially replacing two separate common kitchen tools.

13 Claims, 15 Drawing Sheets

STIRRING AND CHOPPING DEVICE

CROSS REFERENCE TO RELATED APPLICATIONS

This Application takes priority from U.S. Provisional Patent Application No. 61/696,288, filed on Sep. 3, 2012, titled "Stirring and Chopping Utensil", by inventor Eric Paul Rose, the contents of which are expressly incorporated herein by this reference as though set forth in their entirety, and to which priority is claimed.

FIELD OF INVENTION

This invention relates generally to kitchen utensils, and more specifically to a kitchen utensil which is a stirring device and also acts as a chopping device which has an elongated handle with distally connected tapered blades. These tapered blades are intended to cause great agitation to stirred foods and liquids and retain the ability to chop items with a downward force.

BACKGROUND

Cooking remains largely unchanged for great swaths of time. However, often tools are created to make cooking easier or less time consuming. Much of the modernization of cooking has come in the form of ingenious gadgetry and automating manual processes with a machine. However, while the technology is continually changing, not every kind of tool gets a modernized version.

Many of the laborious tasks such as grinding, kneading, and shredding have become mechanized because as people get older, these are often the first tasks that become hard to do. Unfortunately, many relatively simple handheld tools have remained unchanged for decades. While a knife's quality may have increased with modern manufacturing techniques, the same basic concept remains, a handle with a sharp blade. Similarly, stirring devices have remained substantially the same, some sort of handle and some sort of flat end to agitate the liquid or food.

Additionally, with all the advances made in handheld kitchen tools, certain things are still difficult to do, such as chopping something at the bottom of a pot. Most knives are incapable of this because the angles required to chop are impractical with a straight blade attached to a straight handle, and most spatulas are not designed to chop many things. Additionally, spatulas are relatively inefficient in agitating a liquid, and must be used at a specific angle relative to the direction of stirring. Each direction of stirring has its own most efficient angle.

Regarding stirring devices that might be used for cutting, U.S. Pat. No. 5,732,616, issued to Dick D. Bryan discloses a device for separating moist, fatty ground meat. The device disclosed has an elongated handle and separating blades. Importantly, while this invention may be used to cut items, this device is not suitable for stirring, nor is it intended to. The corners of the separating blades are right angles. This type of device would not be particularly useful when attempting to scrape the edges of a pot. Additionally, the device disclosed would not be particularly useful in stirring because of the low amount of volume which is agitated.

Additionally, The Pampered Chef®'s Mix 'N Chop allows a user to stir and chop by using an elongated handle with five beveled pinwheel blades at the distal end. Importantly, this product is also made of a hard plastic, and also has right angles at the edge of the beveled pinwheel blades. These two characteristics taken together create a product which does not efficiently allow a user to scrape the sides and bottom corners of a pot. These two characteristics also mean that the product is difficult to clean.

Furthermore, United States Patent Application Publication Number 2011/0174908, filed by Heather Curtin discloses a squeegee whisk which is capable of effectively scraping the sides of a pot. However, due to the open nature and its purpose of mashing, it is not useful as a stirring or chopping tool.

Thus, what is needed is a way for a user to stir efficiently and be able to also separate and/or cut items at the bottom of a pot.

Whisks have been used for stirring purposes for years. However it is well understood by those who frequently use whisks that such a utensil is prone to having food items lodged inside the metal wire basket of the whisk. This is an inherent flaw in the design of a whisk. Further when a user wishes to remove food items lodged inside the metal wire basket of the whisk, they must either manually spread the whisk's wires apart and allow the trapped food items to fall out of the wire basket or tap the whisk onto the edge of a bowl or similar hard edge of an object. Such an impact will often dislodge the food from inside the whisk. Unfortunately, such an impact will often cause the lodged food to be ejected at such a velocity that the food items will often end up in an undesired location such as on the user, on a countertop, or on the floor.

BRIEF SUMMARY OF THE INVENTION

To minimize the limitations in the cited references, and to minimize other limitations that will become apparent upon reading and understanding the present specification, the present invention discloses a kitchen utensil which allows a user to stir foods and liquids and quickly be able to chop things using the bottom of the stirring device.

One embodiment of this invention is a kitchen utensil device comprising an elongated handle and one or more fins. Preferably a top end of the elongated handle and a bottom end of the elongated handle form endpoints of a central axis. Preferably the one or more fins is distally connected to the bottom end of the elongated handle. Preferably, the one or more fins extends outward from the central axis. Preferably, the one or more fins is curved in the direction of an adjacent fin. Preferably, the one or more fins is tapered along a distal end of the one or more fins, such that the tapering along the distal end of the one or more fins causes the distal end of the one or more fins to become sharpened. Preferably, the one or more fins may be disconnected from the elongated handle. Preferably the elongated handle is configured to facilitate human hand gripping. Preferably, the top end of said elongated handle contains a depressed end. Preferably, the depressed end is configured to facilitate a human appendage to rest on said depressed end to facilitate a chopping action. Preferably, the one or more fins comprises a moderately soft material. Preferably, the said one or more fins comprise of three fins. Preferably, the one or more fins comprises of silicone. Preferably, the one or more fins have rounded corners, configured to efficiently reach corners on pots, pans, bowls, and other containers.

It is understood that the kitchen utensil should be able to agitate liquids and foods at a higher rate than a traditional spatula tool. Also, due to the open spacing of the fins, the product is easy to clean and therefore thicker and stickier materials are removed from the surfaces easily.

An object of the present invention is to provide a kitchen utensil which is able to stir and chop items, without requiring the user to change tools.

It is another object of the present invention to overcome the limitations of the prior art.

Other features and advantages are inherent in the kitchen utensil device claimed and disclosed will become apparent to those skilled in the art from the following detailed description and its accompanying drawings.

DETAILED DESCRIPTION OF THE DRAWINGS

In the following detailed description of the preferred embodiment, reference is made to the accompanying drawings that form a part hereof, and in which is shown, by way of illustration, a specific embodiment in which the invention may be practiced. It is to be understood that other embodiments may be utilized and structural changes may be made without departing from the scope of the present invention.

In the following detailed description of various embodiments of the invention, numerous specific details are set forth in order to provide a thorough understanding of various aspects of one or more embodiments of the invention. However, one or more embodiments of the invention may be practiced without these specific details. In other instances, well-known methods, procedures, and/or components have not been described in detail so as not to unnecessarily obscure aspects of embodiments of the invention. As used here, the word chop is used to mean: chop; cut; separate; cleave; dice; hack; mince; sever; shear; or slash.

Figure 1:
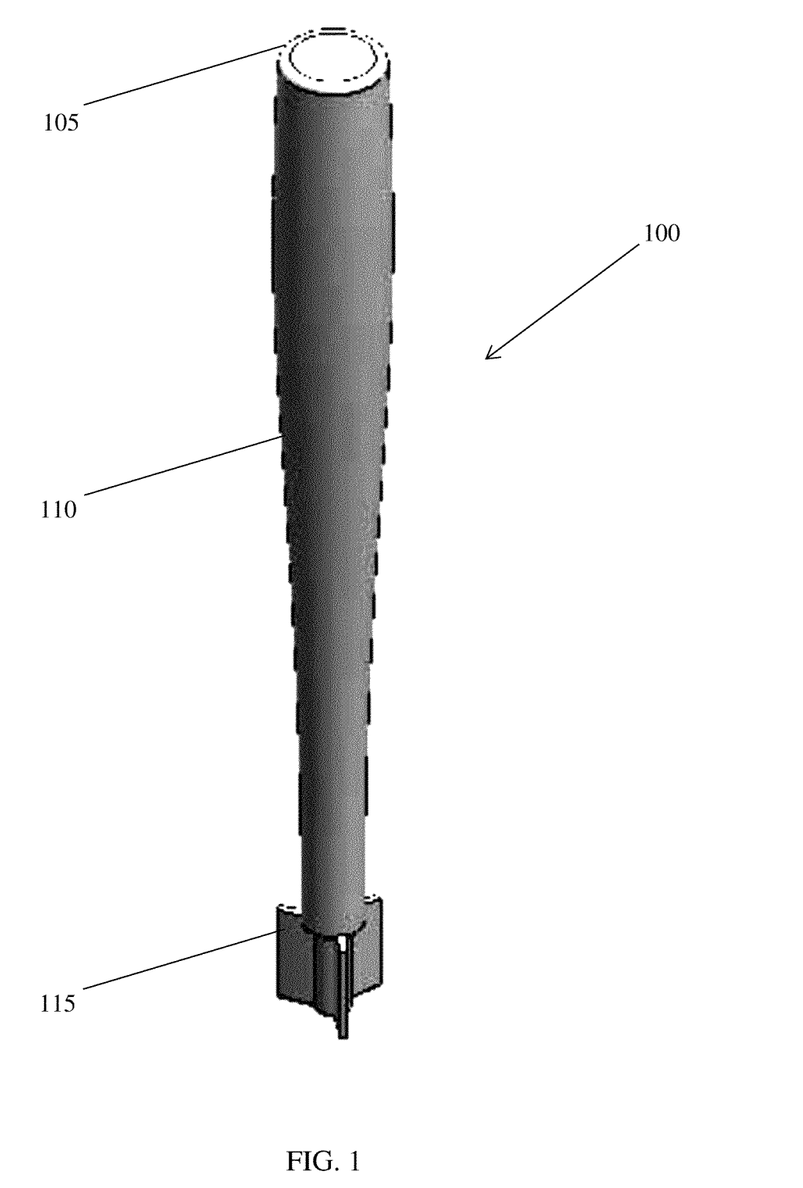
FIG. 1 is a front perspective view of one embodiment of the kitchen utensil.

FIG. 1 is a front perspective view of one embodiment of the kitchen utensil. As shown in FIG. 1, the kitchen utensil 100 preferably includes: a depressed end 105; an elongated handle 110; and one or more fins 115. Preferably, the depressed end 105 is at the top of the elongated handle 110 and allows a user to rest an appendage, such as a thumb. Preferably, this allows a user to better grip the kitchen utensil and apply more downward force. Preferably the elongated handle 110 connects the depressed end 105 and the one or more fins 115. Preferably the elongated handle 110 is configured to allow ease of use by a human hand. Preferably, the one or more fins 115 are attached to the elongated handle 110 opposite of the depressed end 105. Preferably the one or more fins 115 comprise of three fins, curved in a clockwise direction.

Figure 2:
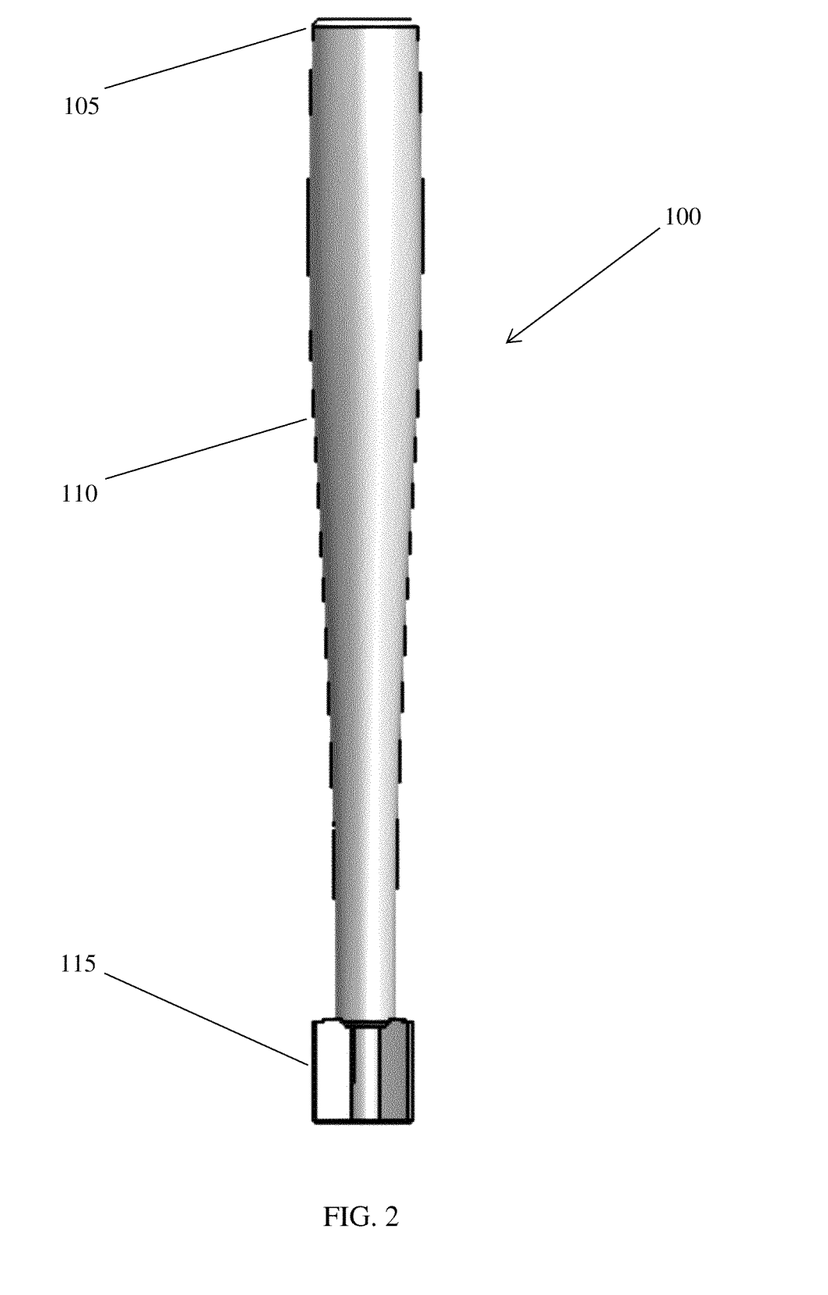
FIG. 2 is a front elevation view of one embodiment of the kitchen utensil.

FIG. 2 is a front elevation view of one embodiment of the kitchen utensil. As shown in FIG. 2, the kitchen utensil 200 preferably includes: a depressed end 205; an elongated handle 210; and one or more fins 215.

Figure 3:
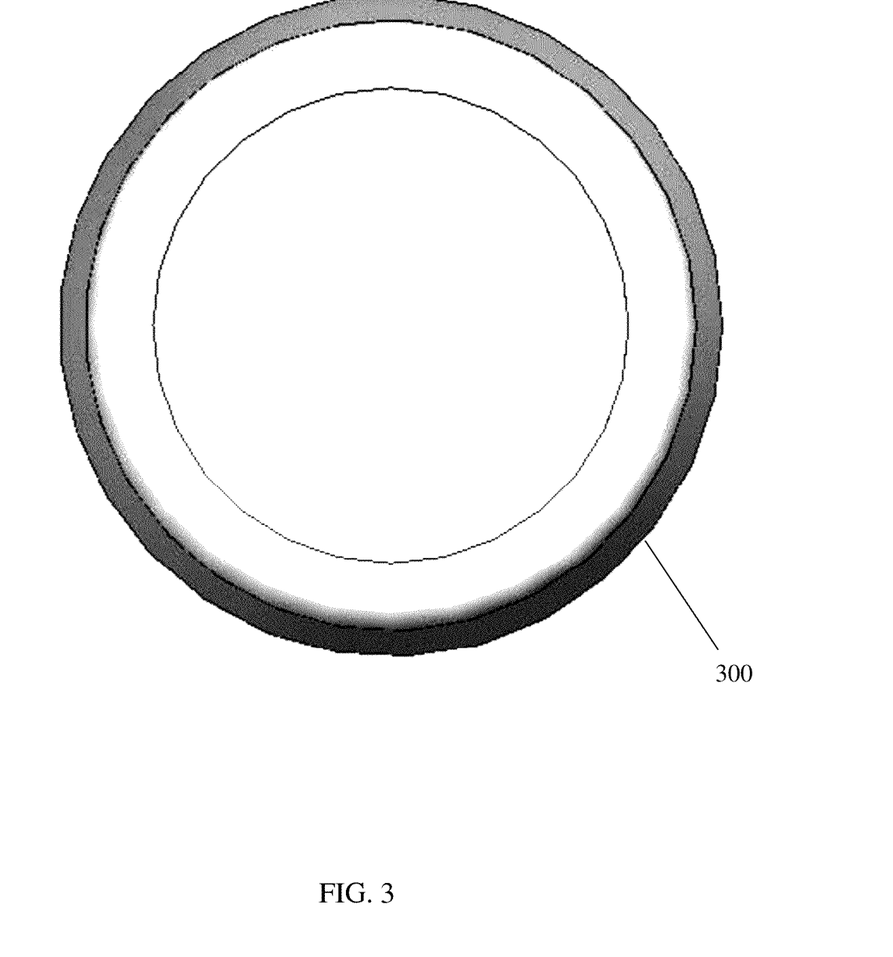
FIG. 3 is a top elevation view of one embodiment of the kitchen utensil.

FIG. 3 is a top elevation view of one embodiment of the depressed end of the kitchen utensil. As shown in FIG. 3, the depressed end 300 is preferably circular and concave, such that a thumb may rest and apply downward force onto the depressed end 300.

Figure 4:
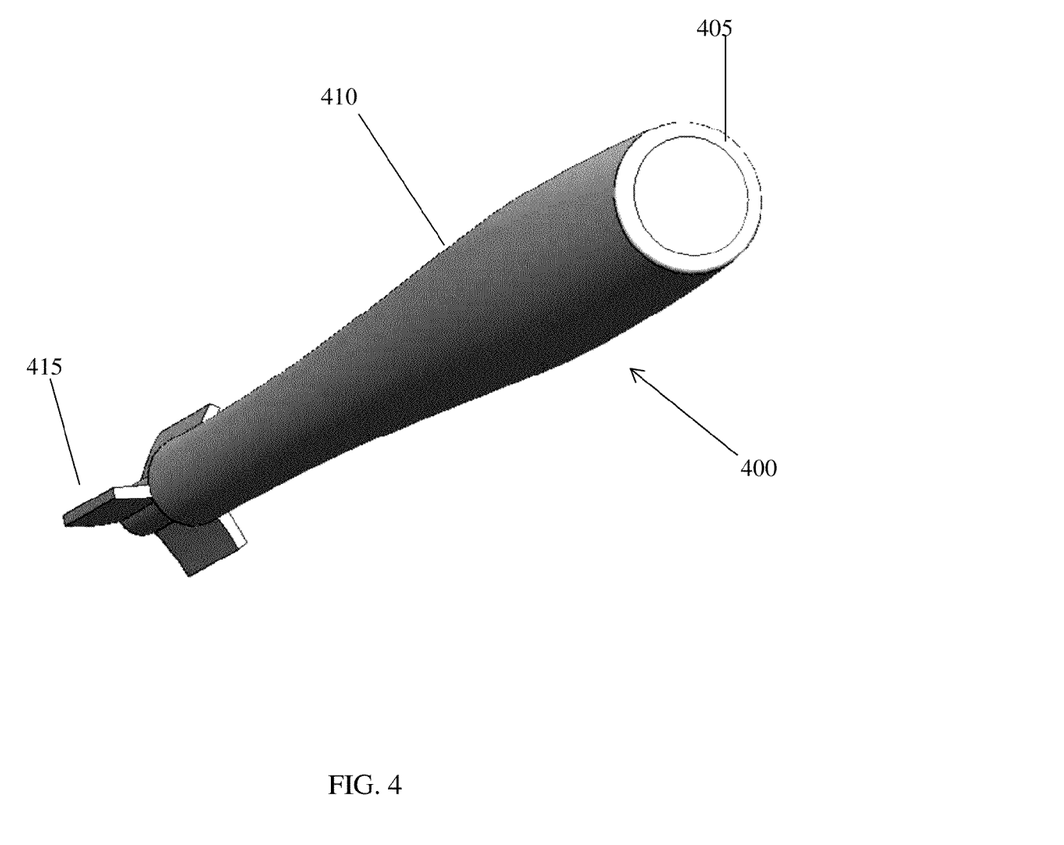
FIG. 4 is a top perspective view of one embodiment of the kitchen utensil.

FIG. 4 is a top perspective view of one embodiment of the kitchen utensil. As shown in FIG. 4, the kitchen utensil 400 preferably includes: a depressed end 405; an elongated handle 410; and one or more fins 415.

Figure 5:
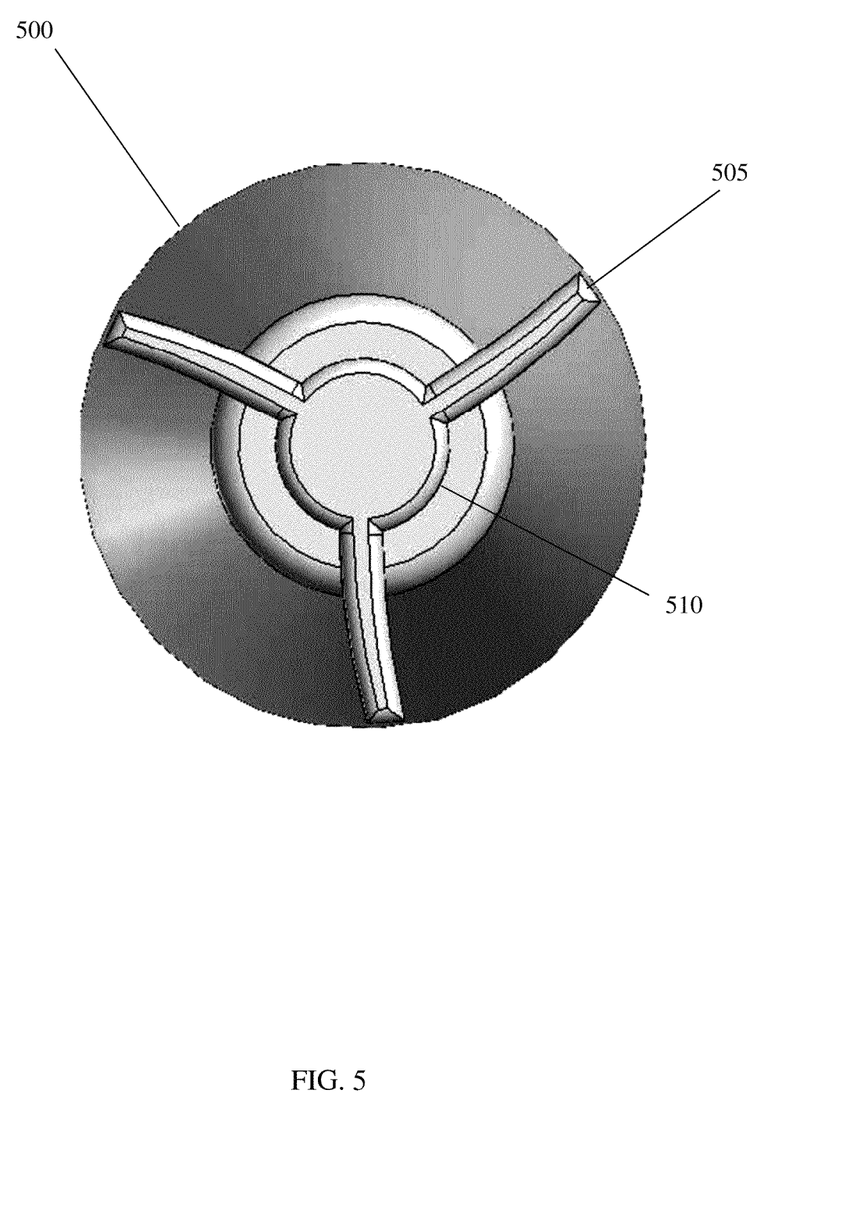
FIG. 5 is a bottom elevation view of one embodiment of the kitchen utensil.

FIG. 5 is a bottom elevation view of one embodiment of the kitchen utensil. As shown in FIG. 5, the elongated handle 500 is preferably attached to the one or more fins 505 through a central attachment member 510 such that the bottom elevation view shows that the base of the one or more fins 505 form a ninety degree angle with the edge of the bottom of the elongated handle 500. Although the fins may join at any angle.

Figure 6:
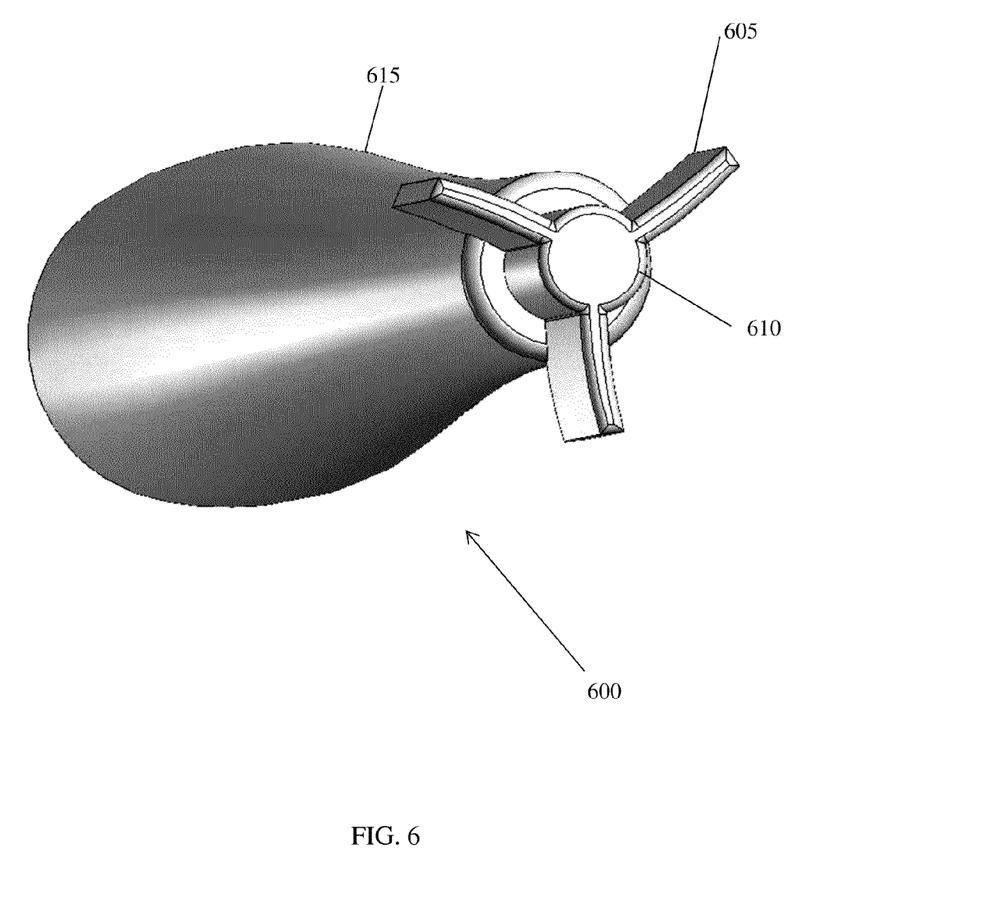
FIG. 6 is a bottom perspective view of one embodiment of the kitchen utensil.

FIG. 6 is a bottom perspective view of one embodiment of the kitchen utensil. As shown in FIG. 5, the kitchen utensil 600 preferably comprises of an elongated handle 615, a central attachment member 610, and one or more fins 605.

Figure 7:
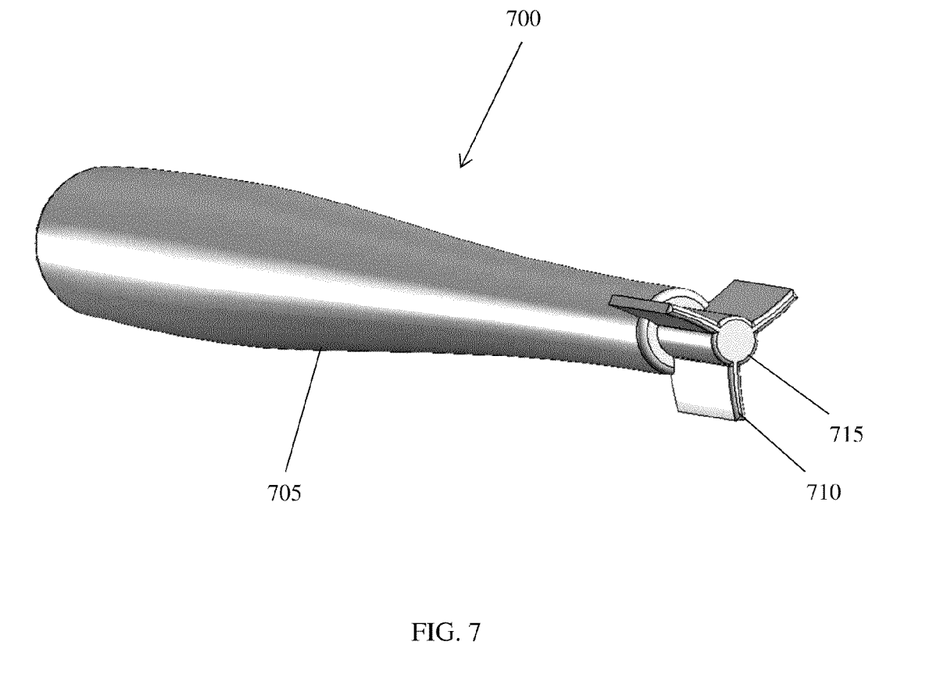
FIG. 7 is a side perspective view of one embodiment of the kitchen utensil.

FIG. 7 is a side perspective view of one embodiment of the kitchen utensil. As shown in FIG. 7, the kitchen utensil 700 preferably comprises: an elongated handle 705; one or more fins 710; and a central attachment member 715.

The central attachment member 715 is preferably slidably attached to the elongated handle 705. The central attachment member may also be fastened to the elongated handle 705 through various fastening means such as twisting, clicking, friction, mating, and any other fastening means.

Figure 8:
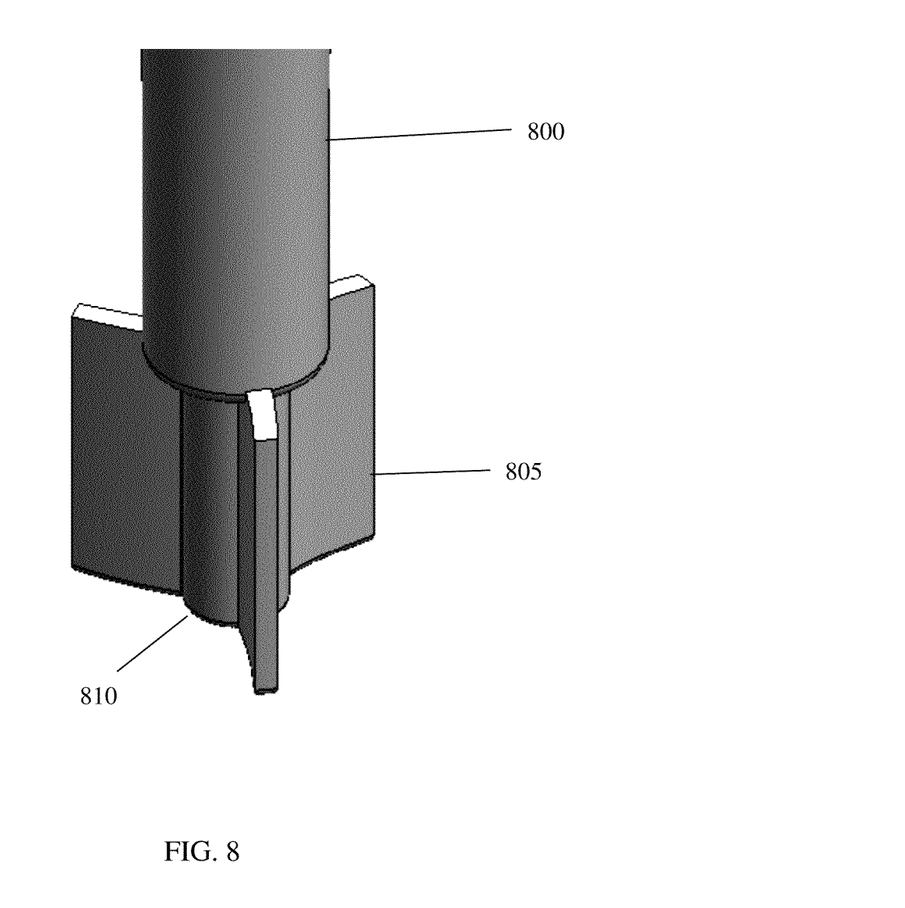
FIG. 8 is a close-up perspective view of one embodiment of the one or more fins used in the kitchen utensil.

FIG. 8 is a close-up perspective view of one embodiment of the one or more fins used in the kitchen utensil. As shown in FIG. 8, the elongated handle 800 is preferably connected to the one or more fins 805 via a central attachment member 810.

Figure 9:
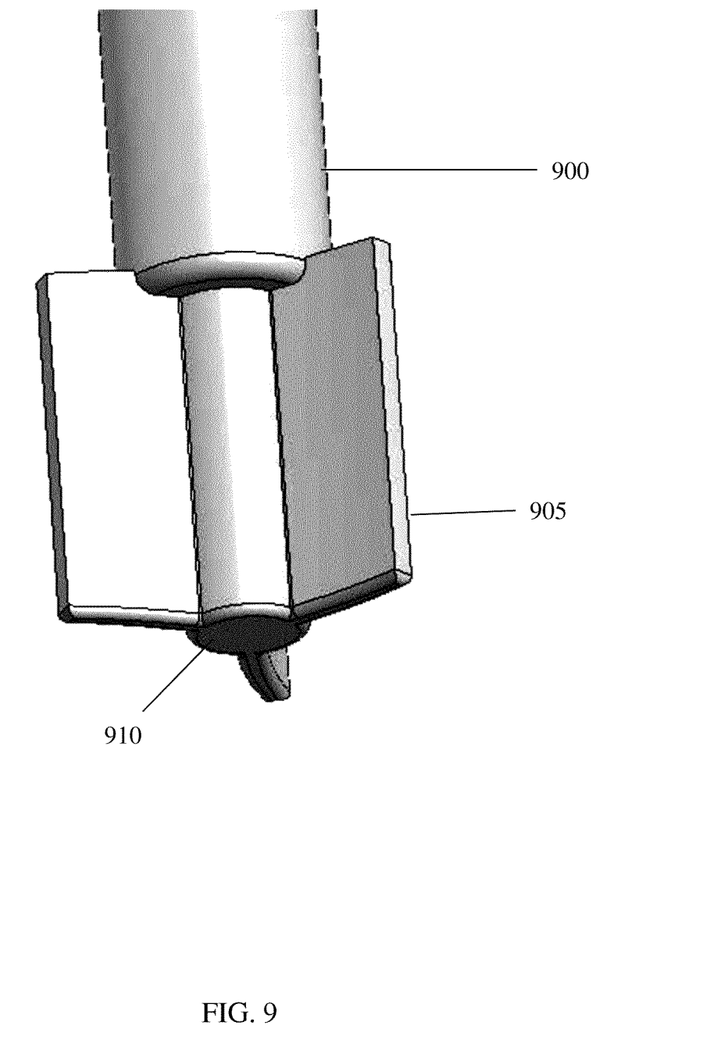
FIG. 9 is another close-up perspective view of one embodiment of one or more fins used in the kitchen utensil.

FIG. 9 is another close-up perspective view of one embodiment of the one or more fins used in the kitchen utensil. As shown in FIG. 9, the elongated handle 900 is preferably connected to the one or more fins 905 via a central attachment member 910.

Figure 10:
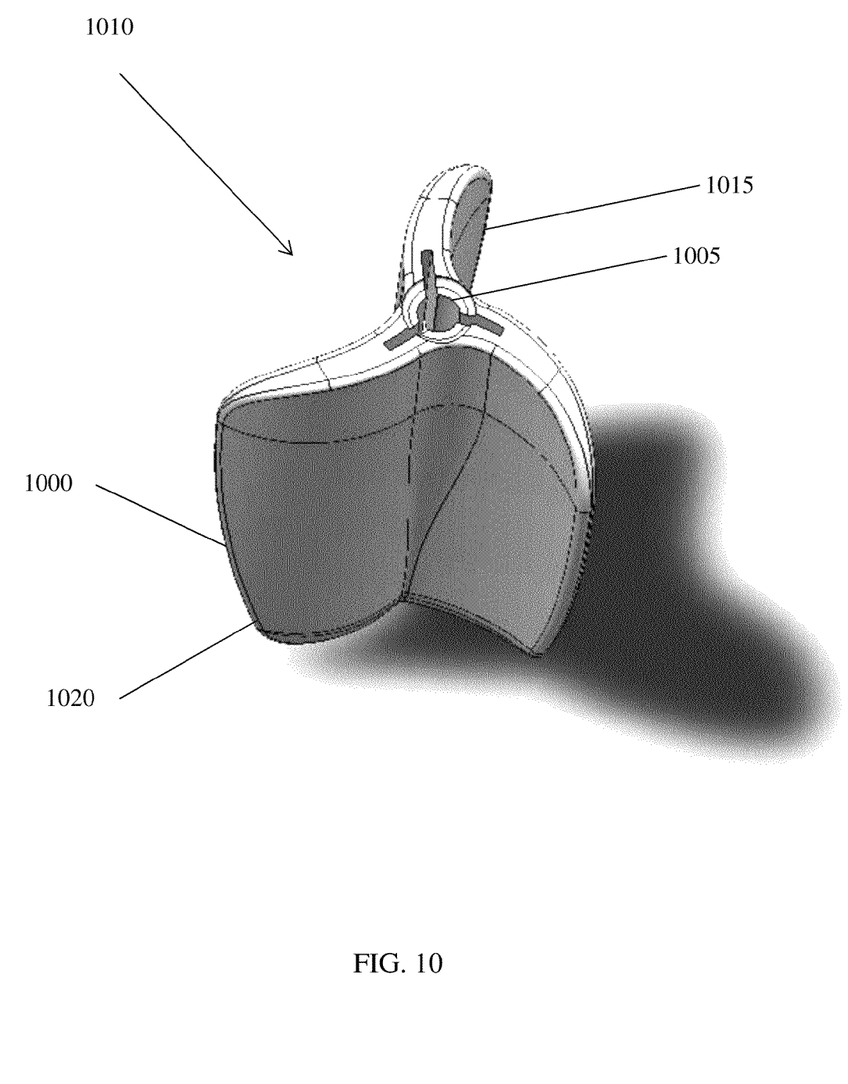
FIG. 10 is a top perspective view of one embodiment of a fin attachment assembly which may be disconnected from the kitchen utensil.

FIG. 10 is a top perspective view of one embodiment of a fin attachment assembly which may be disconnected from the kitchen utensil. As shown in FIG. 10, the fin attachment assembly is preferably comprised of one or more fins 1000 and a central attachment member 1005. Preferably the fin attachment assembly 1010 has rounded corners 1020 to assist in scraping the rounded corners of pots. Preferably the one or more fins 1000 are curved such that from a top elevation view, the one or more fins 1000 are curved in a clock-wise direction towards an adjacent fin 1015.

Figure 11:
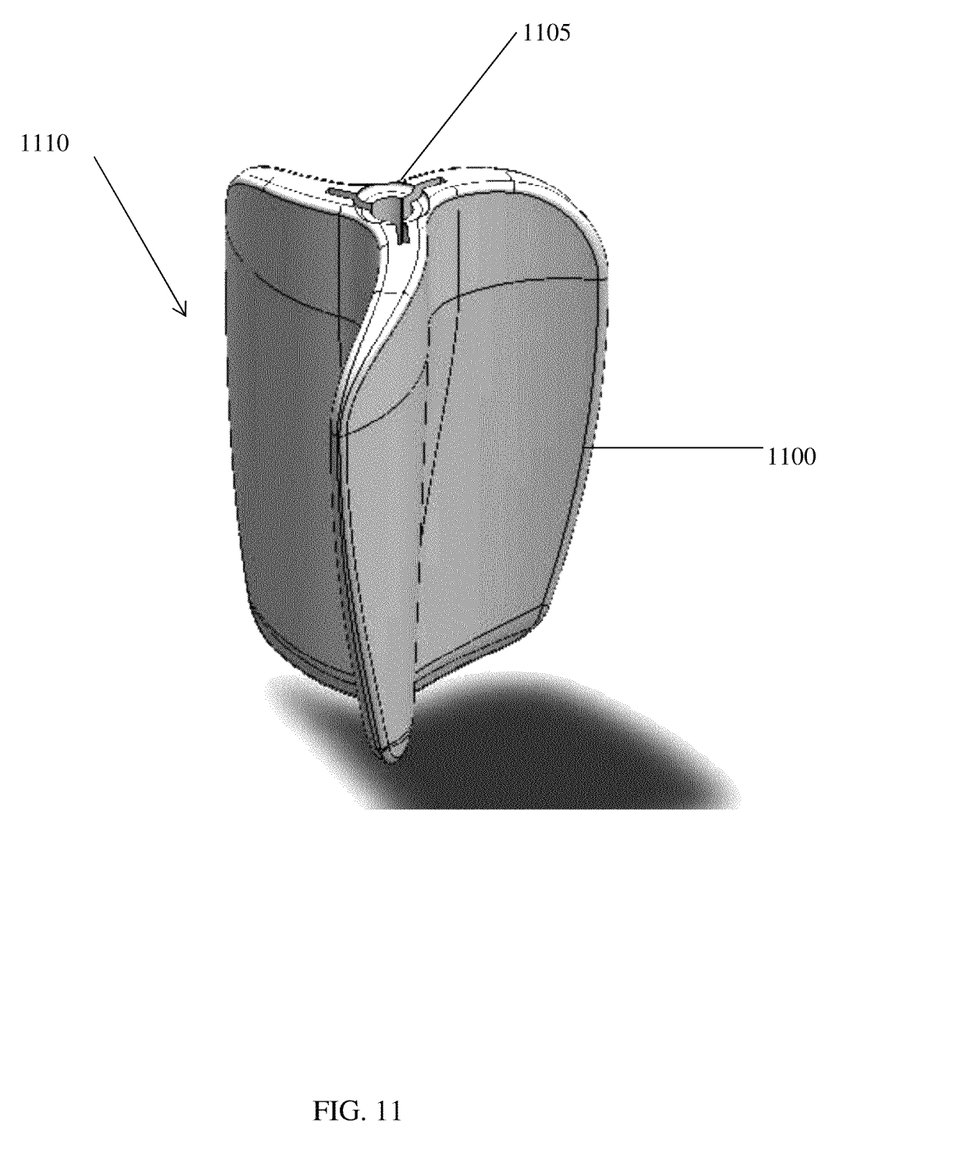
FIG. 11 is another perspective view of one embodiment of a fin attachment assembly which may be disconnected from the kitchen utensil.

FIG. 11 is another perspective view of one embodiment of a fin attachment assembly which may be disconnected from the kitchen utensil. As shown in FIG. 11, the one or more fins 1100 is preferably integrated into a central attachment member 1105 to form a fin attachment assembly 1110.

Figure 12:
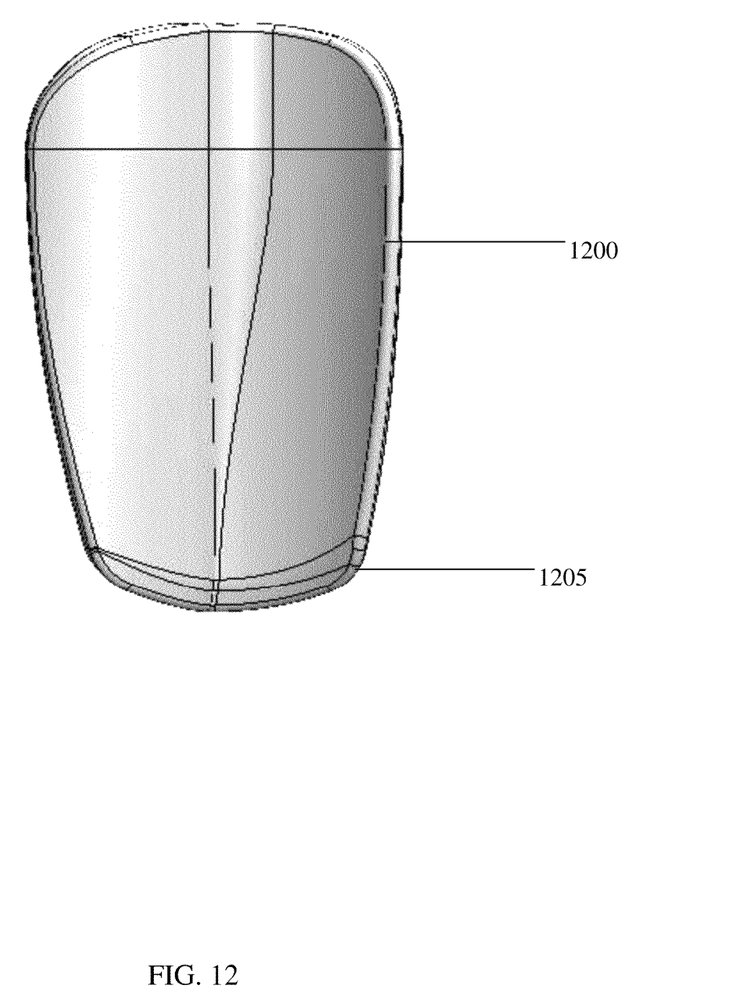
FIG. 12 is a side elevation view of one embodiment of a fin.

FIG. 12 is a side elevation view of one embodiment of a fin.

Figure 13:
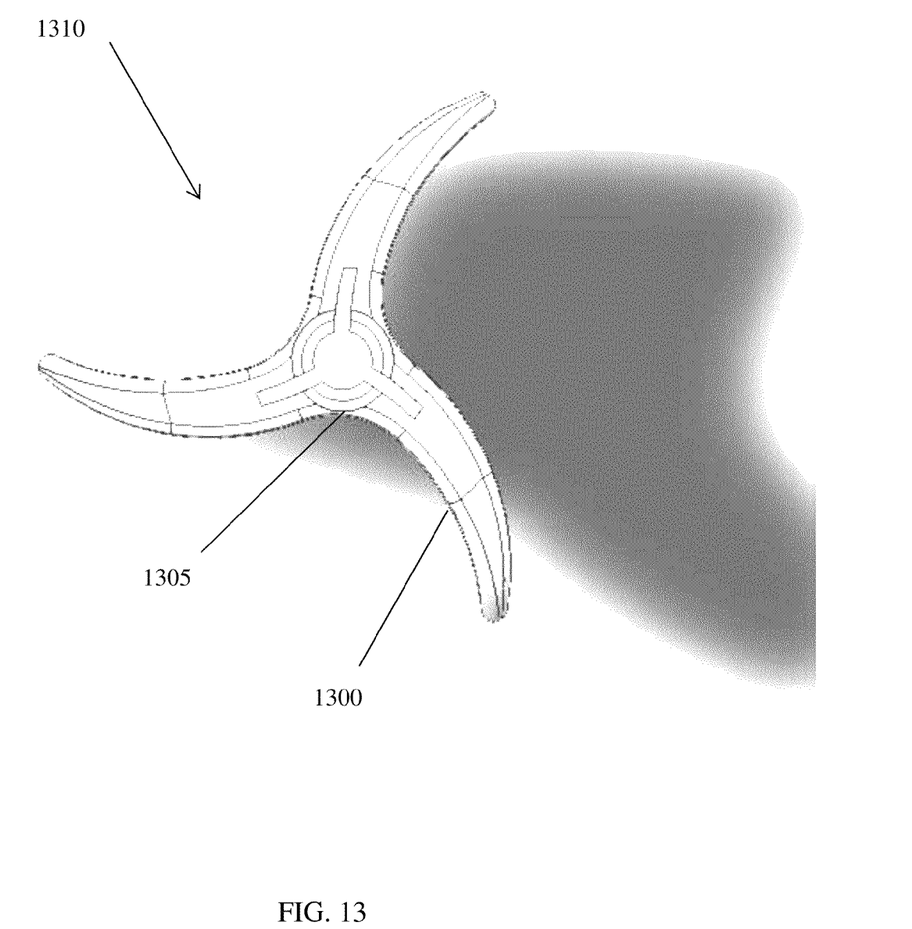
FIG. 13 is a top elevation view of one embodiment of fin attachment assembly which may be disconnected from the kitchen utensil.

FIG. 13 is a top elevation view of one embodiment of a fin attachment assembly which may be disconnected from the kitchen utensil. As shown in FIG. 13, the fin attachment assembly 1310 preferably comprises one or more fins 1300 and a central attachment member 1305.

Figure 14:
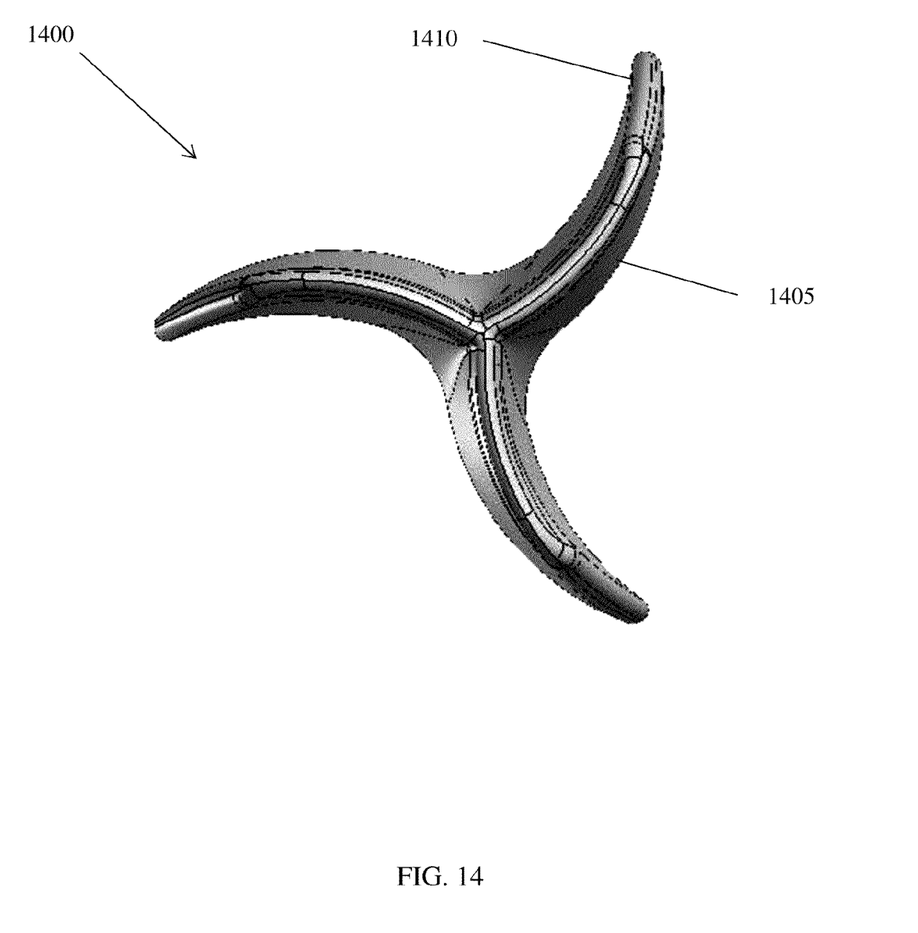
FIG. 14 is a bottom elevation view of one embodiment of a fin attachment assembly which may be disconnected from the kitchen utensil.
Figure 15:
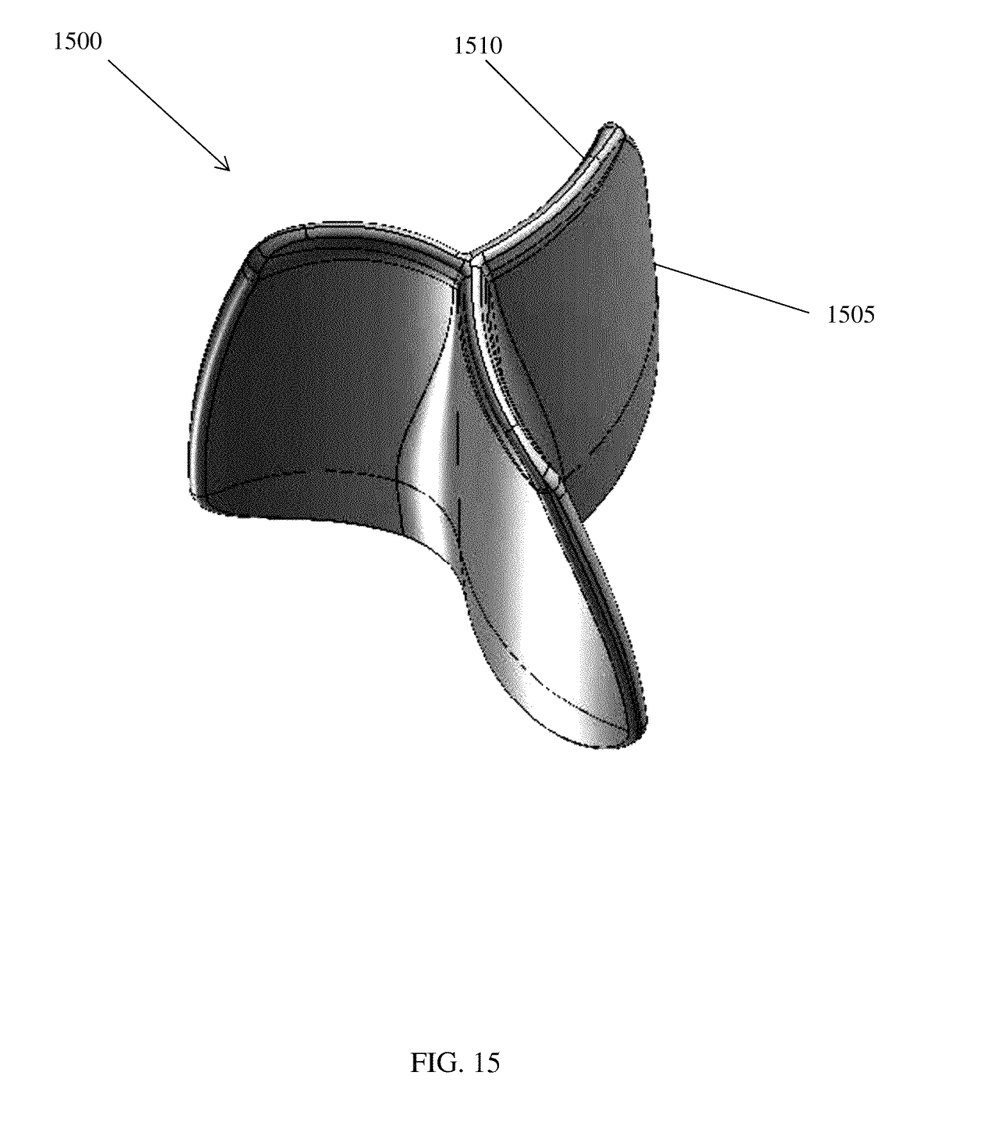
FIG. 15 is a bottom perspective view of one embodiment of a fin attachment assembly which may be disconnected from the kitchen utensil.

FIG. 14 is a bottom elevation view of one embodiment of a fin attachment assembly which may be disconnected from the kitchen utensil. As shown in FIG. 15, the fin attachment assembly 1400 preferably comprises of one or more fins 1405 and tapered edges 1410. Preferably, the tapered edges 1410 are a part of the distal end of the one or more fins 1405. Preferably, the tapered edges 1410 are tapered such that the edge becomes sharpened, capable of cutting items.

FIG. 15 is a bottom perspective view of one embodiment of a fin attachment assembly which may be disconnected from the kitchen utensil. As shown in FIG. 15, the fin attachment assembly 1500 preferably comprises of one or more fins 1505 and tapered edges 1510.

It is understood that while the foregoing detailed description describes fins connected to a central attachment member, it is possible that one or more fins attach directly to an elongated handle.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

What is claimed is:

1. A kitchen utensil device comprising:
   an elongated handle; and
   a fin assembly;
   wherein said fin assembly consists of three fins;
   wherein a top end of said elongated handle and a bottom end of said elongated handle form endpoints of a central axis;
   wherein a handle end of said fin assembly is detachably connected to said bottom end of said elongated handle;
   wherein said fin assembly is a unitary structure, such that said three fins are permanently affixed to said fin assembly;
   wherein said three fins are spaced substantially equidistant from each other around said central axis;
   wherein each of said three fins extends outward from said central axis and comprises a blade portion, a handle end, a tip end, and a distal edge;
   wherein said distal edge of each of said three fins comprises a complete curvature from said handle end to said tip end, such that said distal edge has no substantially flat portions;
   wherein said blade portion of each of said three fins is curved in the direction of an adjacent fin; and
   wherein said three fins are tapered from said central axis to said distal edge of each of said three fins, such that said tapering along said distal edge of said three fins causes said distal edge of said three fins to be narrower than a proximal of each of said three fins.

2. The kitchen utensil device of claim 1, wherein each of said three fins tapers down from said handle end of said fin assembly to said tip end of said three fins.

3. The kitchen utensil device of claim 1, wherein said tip end of each of said three fins comprises a distal end and a proximal end;
   wherein said tip end of each of said three fins curves downward from said distal end to said proximal end, such that said tip end of each of said three fins is not flat and is not perpendicular to said central axis.

4. The kitchen utensil device of claim 3, wherein said three fins of said fin assembly comprise rounded corners between said tip end and said distal edge, such that said three fins are configured to efficiently reach corners on pots, pans, bowls, and other containers.

5. The kitchen utensil of claim 4, wherein said fin assembly is constructed of silicone.

6. The kitchen utensil device of claim 1, wherein said tip end of each of said three fins comprises a distal end and a proximal end;
   wherein said tip end of each of said three fins curves downward from said distal end to said proximal end, such that said tip end of each of said three fins is not flat and is not perpendicular to said central axis.

7. The kitchen utensil device of claim 1, wherein said fin assembly is constructed of silicone.

8. The kitchen utensil device of claim 1, wherein said three fins of said fin assembly comprise rounded corners between said tip end and said distal edge, such that said three fins are configured to efficiently reach corners on pots, pans, bowls, and other containers.

9. A kitchen utensil device, comprising:
   a handle; and
   a fin assembly;
   wherein said fin assembly consists of three identical fins that are spaced substantially equidistant from each other around a central axis defined by said handle;
   wherein said fin assembly is a single structure, such that said three fins are permanently affixed to said fin assembly;
   wherein said handle has a bottom end and a top end;
   wherein said fin assembly has a handle end and a tip end;
   wherein said bottom end of said handle and said handle end of said fin assembly detachably connect;
   wherein each of said three fins extends outward from said central axis and comprise a blade portion, handle end, a distal edge, and a tip end;
   wherein said distal edge of each of said three fins comprises a complete curvature from said handle end to said tip end, such that said distal edge has no substantially flat portions;
   wherein said blade portion of each of said three fins is curved in the direction of an adjacent fin;

wherein said blade portion of each of said three fins all curve in the same direction; and wherein said three fins are tapered from said central axis to said distal edge of said three fins, such that said tapering to said distal edge of said three fins causes said distal edge of said three fins to be narrower than a proximal end of each of said three fins.

10. The kitchen utensil device of claim 9, wherein each of said three fins tapers down from said handle end of said fin assembly to said tip end of said fin assembly.

11. The kitchen utensil device of claim 10, wherein said tip end of said fin assembly comprises three fin tip ends;

wherein said three fin tip ends each has a distal end and three fin proximal end;

wherein each of said three fin tip ends curves downward from said distal end to said proximal end, such that each of said three fin tip ends is not flat and is not perpendicular to said central axis.

12. The kitchen utensil device of claim 11, wherein said three fins of said fin assembly comprise rounded corners between said tip end and said distal edge, such that said three fins are configured to efficiently reach corners on pots, pans, bowls, and other containers.

13. The kitchen utensil of claim 12, wherein said fin assembly comprises silicone.

* * * * *